United States Patent [19]

Yoshizu

[11] Patent Number: 5,477,834
[45] Date of Patent: Dec. 26, 1995

[54] FUEL INJECTION CONTROL APPARATUS

[75] Inventor: Fumutsugu Yoshizu, Higashimatsuyama, Japan

[73] Assignee: Zexel Corporation, Tokyo, Japan

[21] Appl. No.: 341,970

[22] Filed: Nov. 16, 1994

[30] Foreign Application Priority Data

Nov. 25, 1993 [JP] Japan ................. 5-319072

[51] Int. Cl.⁶ ................................................. F02D 41/40
[52] U.S. Cl. .......................... 123/501; 123/496; 123/299
[58] Field of Search ........................ 123/446, 447, 123/456, 457, 459, 496, 299

[56] References Cited

U.S. PATENT DOCUMENTS

| | | | |
|---|---|---|---|
| 4,359,032 | 11/1982 | Ohie | 123/458 |
| 4,594,979 | 6/1986 | Yasuhara | 123/357 |
| 4,628,881 | 12/1986 | Beck et al. | 123/446 |
| 4,800,859 | 1/1989 | Sagisaka et al. | 123/459 |
| 4,957,085 | 9/1990 | Sverdlin | 123/446 |
| 5,058,553 | 10/1991 | Kondo et al. | 123/446 |
| 5,101,785 | 4/1992 | Ito | 123/299 |
| 5,115,783 | 5/1992 | Nakamura et al. | 123/496 |
| 5,150,684 | 9/1992 | Jun | 123/496 |
| 5,156,132 | 10/1992 | Iwanaga | 123/496 |
| 5,313,924 | 5/1994 | Regueiro | 123/456 |

*Primary Examiner*—Thomas N. Moulis
*Attorney, Agent, or Firm*—Wenderoth, Lind & Ponack

[57] ABSTRACT

A fuel injection control apparatus that is used in a diesel engine or the like, controls a fuel injection rate by adjusting the injection valve opening pressure of a injection nozzle. A plurality of different thresholds are set and compared with a signal indicative of the injection rate in order to identify a reference injection start time and an initial injection rate control period. The injection timing and the injection valve opening pressure of the injection nozzle are controlled in such a manner that these identified time and period will match an optimal initial injection rate control period and an optimal reference injection start time which are stored in memory in advance for individual sets of operating conditions. With this, the optimal injection state can be achieved during the initial stage (initial injection rate control period) of the injection period.

8 Claims, 7 Drawing Sheets

FUEL INJECTION CONTROL APPARATUS

BACKGROUND OF THE INVENTION

1. Field of the Invention

The present invention relates to a fuel injection control apparatus that is used in diesel engines and the like and which controls a fuel injection rate by adjusting an injection valve opening pressure of an injection nozzle.

2. Description of the Related Art

In fuel injection control, in addition to controlling the injection start time and the injection quantity, it is necessary to control the injection rate in order to achieve a desired injection waveform. Among control apparatuses of this type in the prior art, Japanese Unexamined Patent Publication S61-96163, for example, discloses an apparatus that controls the injection valve opening pressure of the injection nozzles with hydraulic pressure, achieved in this particular case by a technology through which deviation of injection rate characteristics and changes over time are eliminated by feed-back control of the oil pressure in such a manner that the peak value of the injection valve opening pressure matches a target value.

In a typical pump line nozzle system (a system which supplies fuel that has been compressed by a fuel injection pump to a nozzle via piping) or a typical unit injector, the injection quantity output from the time when the fuel is first injected from the nozzle until it is ignited (the period preceding the start of the main injection) is considered to be an important factor in indicating the characteristics of the fuel system. Alan P. Gill, in "Design Choices for 1990's Low-Emission Diesel Engines," SEA Technical Paper Series, 880350, notes that it has been verified that the smaller the injection quantity during this initial injection rate control period, the smaller the discharge of NOx. Consequently, injection control through the entire injection period, and in particular, during the initial injection rate control period, must be performed in accordance with various operating conditions such as the engine load, the rpm and the like.

However, the prior art described above performs control only to the extent that the peak value of the injection valve opening pressure is matched to a target value and it is not, therefore, possible to control the injection characteristics during the initial injection rate control period with great precision. In order to overcome this problem, control processing based upon a new concept is required.

SUMMARY OF THE INVENTION

The main object of the present invention is to provide a fuel injection control apparatus with which an optimal injection state can be achieved during the initial stage of the injection period.

Accordingly, the fuel injection control apparatus according to the present invention comprises a compression mechanism for compressing fuel, an injection nozzle that injects the fuel that has been compressed in the compression mechanism, an injection valve opening pressure adjusting mechanism that adjusts the injection valve opening pressure of the injection nozzle, and a timing device that adjusts the timing of the injection of fuel. It is further provided with a sensor which outputs a signal that corresponds to the injection rate, a means for calculation that sets a plurality of different thresholds for the output signals from the sensor, sets the period beginning from the threshold that defines the injection start to the threshold at a specific level that is larger than the threshold defining the injection start, as the initial injection rate control period, sets the time point when the operation has reached the threshold that defines the start of the reference injection as the reference injection start time and calculates at least these, and a means for control that controls the injection valve opening pressure through the injection valve opening pressure adjusting mechanism and the injection timing through the timing device in such a manner that the initial injection rate control period and the reference injection start time described above will be the optimal initial injection rate control period and the optimal reference injection start time, both of which are stored in memory in advance.

Here, the threshold that defines the start of the reference injection may be the threshold that defines the injection start described above or the threshold that is set at the specific level higher than the first threshold, also described above.

As a result, it is possible to detect the initial injection rate control period at the same time as the detection of the reference injection start time and these two parameters are used as representative parameters for identifying the initial injection state. In addition, since the injection valve opening pressure of the injection nozzle and the injection timing are closed-loop controlled, by referencing them against at least these two measured values, the optimal initial injection rate control period and the optimal reference injection start time are obtained under any operating conditions.

Because of this, according to the present invention, since the injection valve opening pressure and the injection timing of the injection nozzle are controlled in such a manner that after at least the reference injection start time and the initial injection rate control period are measured, these measured values will become the target values, and optimal initial injection characteristics can be achieved over the entire operating range in which control is possible.

Also, under the same operating conditions, the optimal reference injection start time and the optimal initial injection rate control period can be constantly reset in response to external factors such as the environment, changes in operating conditions over time and the like, and it is possible to raise the engine's dynamic performance to its inherent limit, and to maximize fuel economy performance while reducing emissions.

Furthermore, control is performed in real time while the actual fuel injection rate is identified, there are a number of advantages achieved, such as that the adjusting process for the injection system can be eliminated.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 5(a) shows a sensor signal indicating the output from the lift sensor, FIG. 5(b) shows the correspondence of rectangular wave A that is set to HI to the lift sensor output at the threshold 1 (T/H–1) or higher while FIG. 5(c) shows the correspondence of the rectangular wave B that is set to HI to the lift sensor output at the threshold 2 (T/H–2) or higher, and FIG. 5(d) shows the rectangular wave that is the result of subtracting the rectangular wave B from the rectangular wave A;

FIG. 7(a) shows a sensor signal indicating the output from the lift sensor, FIG. 7(b) shows the correspondence of the rectangular wave C that is set to HI to the lift sensor output at the threshold 1 (T/H–1) or higher while FIG. 7(c) shows the correspondence of the rectangular wave D that is set to HI to the lift sensor output at the threshold 2 (T/H–2) or higher and FIG. 7(d) shows the correspondence of the rectangular wave E that is set to HI to the lift sensor output at the threshold 3 (T/H–3) or higher, FIG. 7(e) shows the rectangular wave that is set to HI between the initia rise of the rectangular wave C and the initial fall of the rectangular wave D and FIG. 7(f) shows the rectangular wave that is set to HI between the initial rise of the rectangular wave C and the rise of the rectangular wave E.

DETAILED DESCRIPTION OF THE PREFERRED EMBODIMENTS

The following is an explanation of embodiments of the present invention with reference to the drawings.

Figure 1:
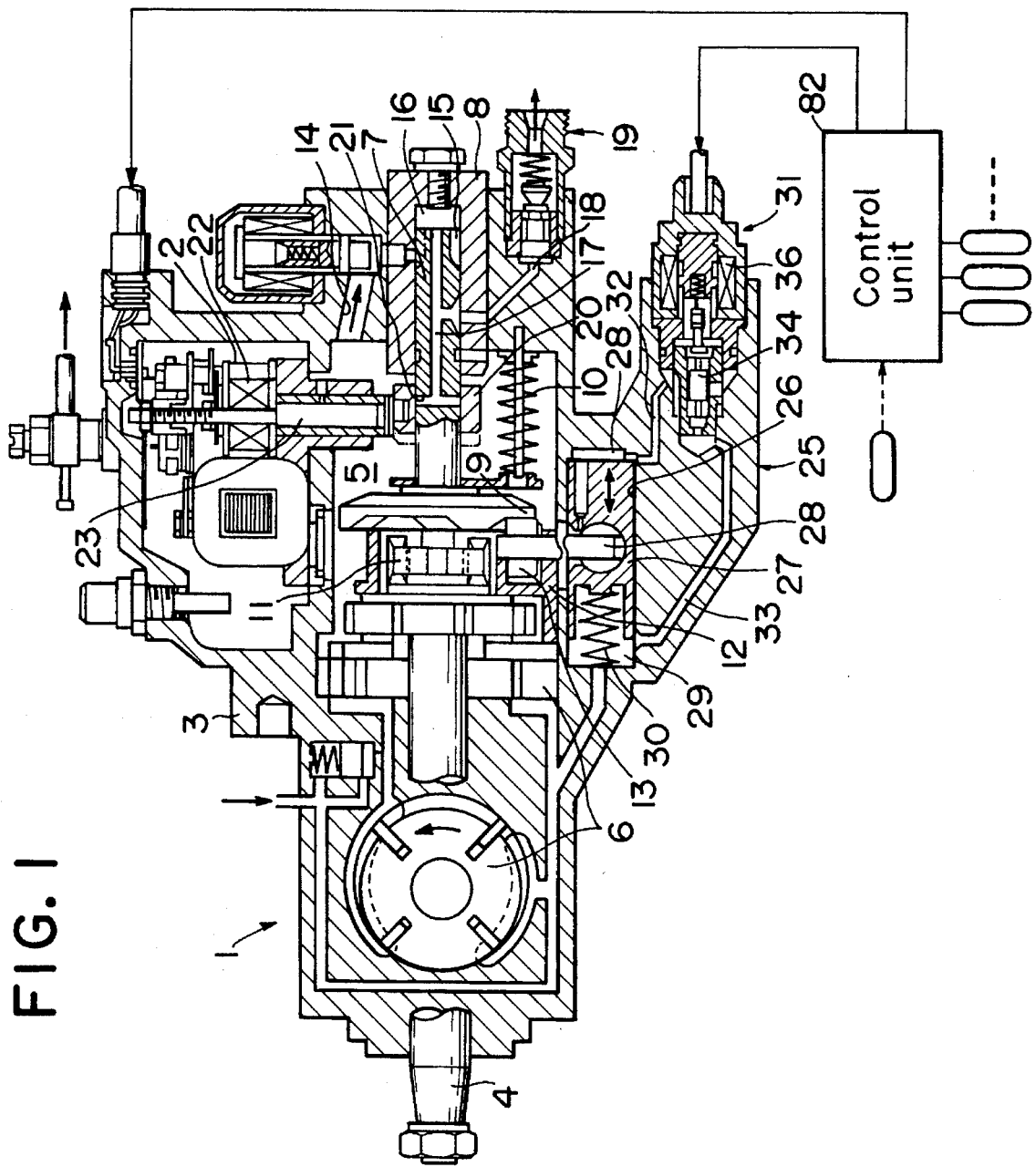
FIG. 1 is a cross section showing an example of a distributor-type fuel injection pump.

In FIG. 1, a fuel injection pump 1 is provided with a housing 3 in which an actuator 2, referred to as an electronic governor, is mounted. At the center of this housing 3, a drive shaft 4 is inserted. One end of the drive shaft 4 projects outside of the housing 3 to receive the drive torque from an engine 81 (shown in FIG. 3) and the other end of the drive shaft 4 extends into a high pressure fuel chamber 5 inside the housing 3. A feed pump 6 is linked to the drive shaft 4 and fuel from a fuel tank (not shown) is supplied to the high pressure fuel chamber 5 through the feed pump 6.

A plunger 7 is provided in a plunger barrel 8 in such a manner that it can slide freely. The base portion of the plunger 7 is pressed down by a plunger spring 10 so that it is in contact with a cam disk 9. The cam disk 9 is connected to the drive shaft 4 via a coupling 11 in such a manner that it can move in the direction of the shaft axis and, at the same time, it is in contact with a roller 13 that is supported by a roller holder 12. With the rotation of the cam disk 9, a reciprocal motion for intake and force-feed of fuel and a rotating motion for distributing the fuel are simultaneously imparted to the plunger 7.

Accordingly, the plunger 7 and the group of mechanisms that drive it constitute a compression mechanism and during the intake process, in which the plunger 7 moves to the left in the figure, the fuel that is supplied to the high pressure fuel chamber 5 via the oil transfer pump is supplied to a pump chamber 16 that is enclosed by the plunger barrel 8 and the plunger 7 via one of the intake grooves 15 that are formed by extending from an intake port 14 in the direction of the front end of the shaft of the plunger 7. During the force-feed process, when the plunger 7 travels to the right in the figure, the intake port 14 and the intake grooves 15 are cut off from each other, the fuel that has been compressed in the pump chamber 16 travels through a longitudinal hole 17 in the plunger 7 to enter one of the distributing passages 18 via the distributor port and then it is discharged via the delivery valve 19.

Also, a control sleeve 20 is externally fitted on the portion of the plunger 7 that protrudes out from the plunger barrel 8 in such a manner that it can slide freely. Since, when the cut-off port 21 that communicates with the longitudinal hole 17 of the plunger 7 moves away from the side edge of the control sleeve 20 and opens into the high pressure fuel chamber 5, the compressed fuel flows out into the high pressure fuel chamber 5, the output of fuel to the injection nozzle, which is to be explained later, stops, thus ending injection. Because of this, the end of injection, and therefore, the injection quantity, can be adjusted through positional adjustment of the control sleeve 20. As the control sleeve 20 is moved to the left in the figure, the injection quantity is reduced and as the control sleeve is moved to the right, the injection quantity is increased.

The front end of a shaft 23, which is mounted to a rotor 22 of the actuator 2, is connected to the control sleeve 20. The front end of the shaft 23 is decentered on the axis of the shaft 23 and, consequently, the actuator 2 can adjust the position of the control sleeve 20 through the rotation of the rotor 22.

A timing device 25 is provided with a timing piston 27 that is housed in a cylinder 26 that is provided below the roller holder 12 described earlier in such a manner that it can slide freely. The timing piston 27 is linked to the roller holder 12 via a lever 28 to rotate the roller holder 12 with its movement, and consequently to adjust the injection timing.

At one end of the timing piston 27, a high pressure chamber 28 is formed, into which the fuel from the high pressure fuel chamber 5 is induced, and at the other end, a low pressure chamber 29 is formed, which communicates with the intake path of the feed pump 6. Also, in the low pressure chamber 29, the timing spring 30 is mounted and with this, a constant force is applied to the timing piston 27 toward the high pressure chamber. As a result, the timing piston 27 stops at a position where the spring pressure of the timing spring 30 and the oil pressure in the high pressure chamber are in balance. When the pressure in the high pressure chamber increases, the timing piston 27 moves toward the low pressure chamber in resistance to the timing spring 30, and the roller holder 12 rotates in the direction in which the injection timing is advanced to advance the injection timing. Also, if the pressure in the high pressure chamber becomes low, the timing piston 27 moves toward the high pressure chamber and the roller holder 12 is rotated in the direction in which the injection timing is delayed to delay the injection timing.

At this point, the pressure in the high pressure chamber 28 of the timing device 25 is adjusted with a timing control valve (TCV) so that the required timing advance angle can be achieved. This timing control valve 31 is provided with a fuel intake 32 that communicates with the high pressure chamber 28 at the side surface portion and it is also is provided with a fuel outlet 33, which communicates with the low pressure chamber 29 at the front end portion. Inside the timing control valve 31, the needle 34 which opens and closes the communication between the fuel intake 32 and the fuel outlet 33 is housed. A constant force is applied to the needle 34 by a spring in the direction in which the communication between the fuel intake 32 and the fuel outlet 33 is cut off. When electricity is supplied to the solenoid 36, the needle 34 is attracted to the solenoid 36 in resistance to the spring so that fuel intake 32 and the fuel outlet 33 communicate.

Consequently, when no electric current is running to the solenoid 36, the high pressure chamber 28 and the low pressure chamber 29 are completely disconnected from each other and when an electric current is running, the high pressure chamber 28 and the low pressure chamber 29 are connected, to reduce the pressure in the high pressure chamber 28. As the pressure in the high pressure chamber 28 is reduced, the timing piston 27 moves to the position where it is in balance with the spring force of the timing spring 30 to change the injection timing.

In actuality, the pressure in the high pressure chamber 28 is adjusted through duty ratio control for the timing control valve 31. This duty ratio is controlled by the control unit 82 and when the duty ratio is at 0%, the timing control valve 31 is in the full open state and the injection timing state is at its most delayed angle. When the duty ratio is at 100%, the timing control valve 31 is in the full closed state and the injection timing state is at its most advanced angle.

Figure 2:
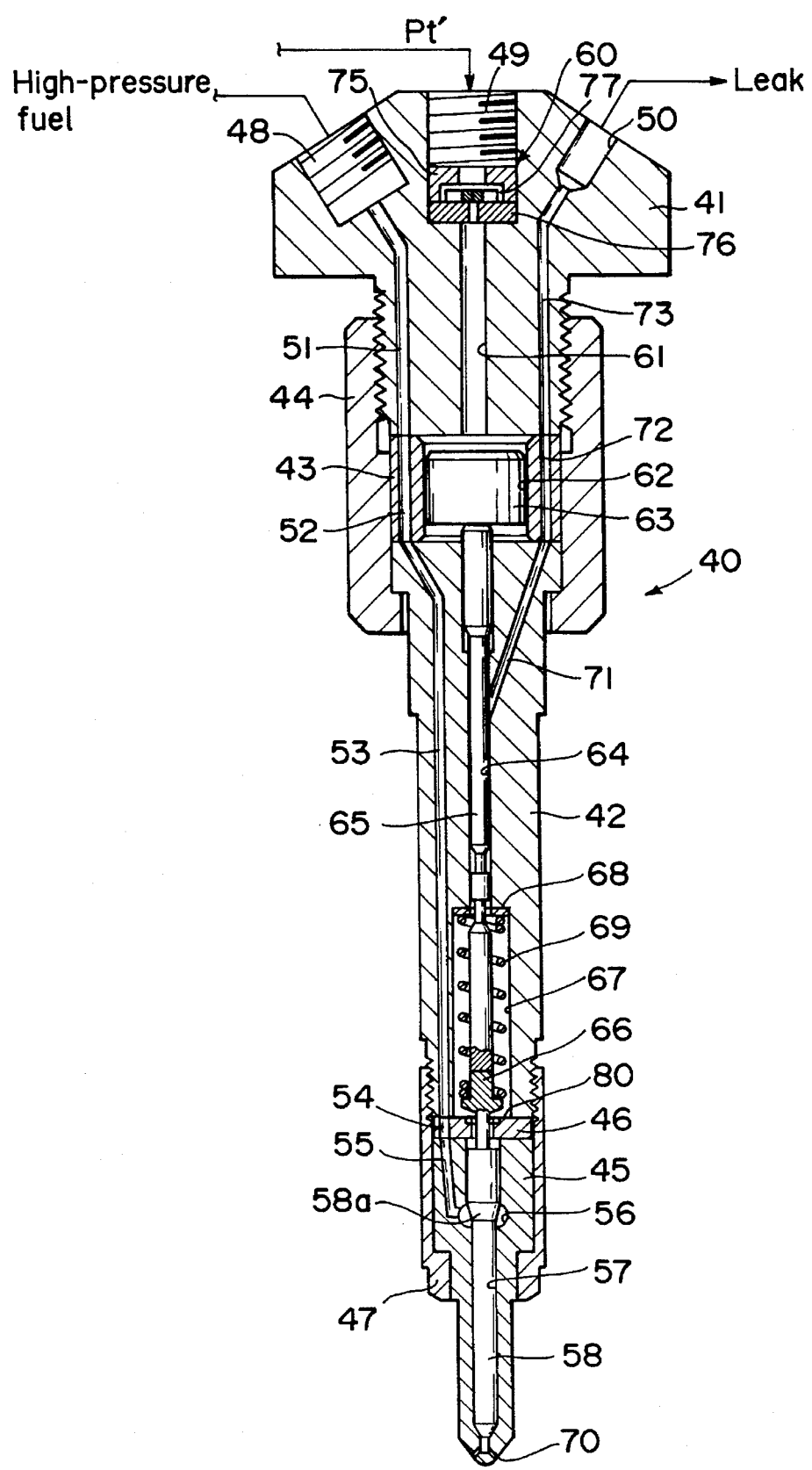
FIG. 2 is a cross section showing an injection nozzle.

The fuel which is discharged from the delivery valve 19 is then sent to the injection nozzle 40 as shown in FIG. 2, to be injected into the cylinder of the engine. The injection nozzle 40 is provided with a cylinder 43 between a nozzle holder head 41 and a nozzle holder main body 42. These members, the cylinder 43, the nozzle holder head 41 and the nozzle holder main body 42 are tightened together as a unit with a lock nut 44. The nozzle body 45 is provided at the lower end portion of the nozzle holder main body 42 via the spacer 46 and these members, i.e., the nozzle holder main body 42, the spacer 46 and the nozzle body 45 are tightened together as one with a retaining nut 47.

Figure 3:
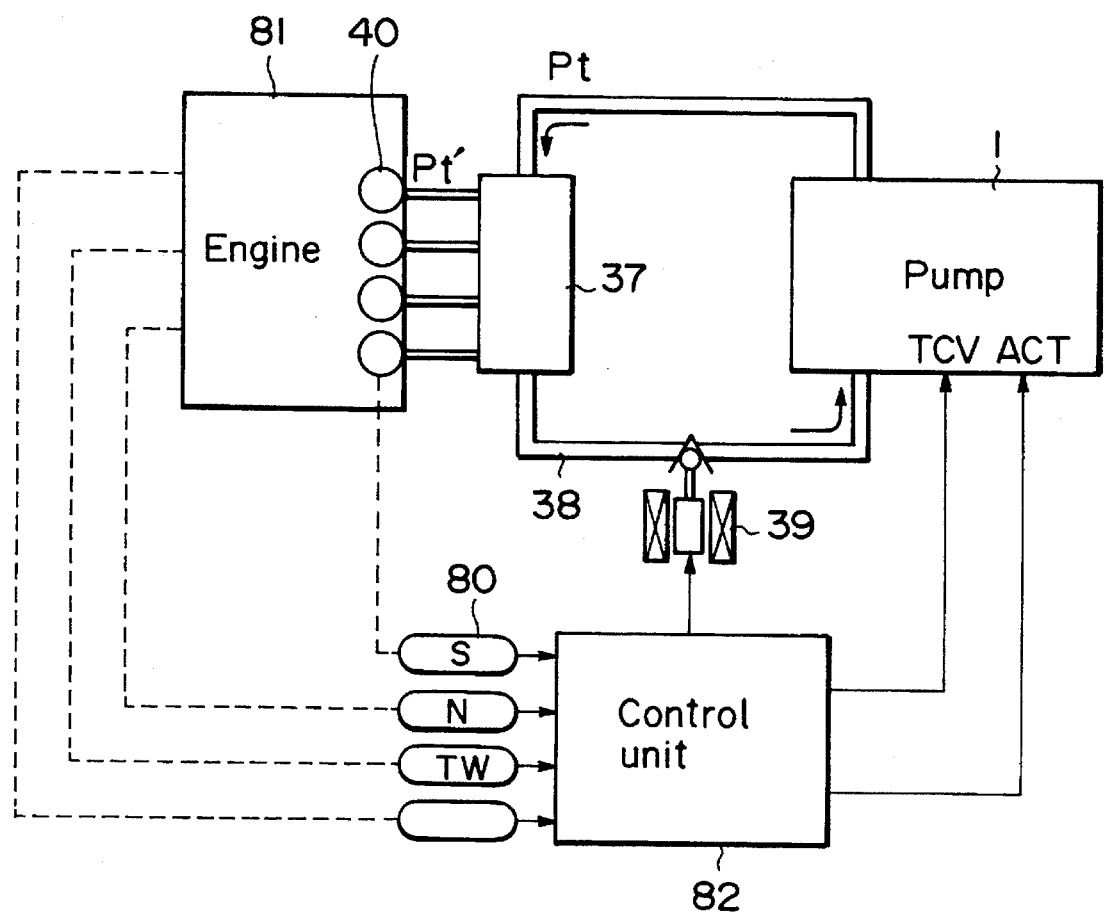
FIG. 3 is schematic block diagram illustrating the relationship between the injection pump, the injection nozzles and the engine.

A fuel intake 48, a pressure inlet port 49 and an overflow outlet port 50 are formed at the upper end portion of the nozzle holder head 41 with the fuel intake 48 communicating with the delivery valve 19 of the fuel injection pump 1 via piping (not shown) to supply high pressure fuel. Note that the pressure inlet port 49 is connected to the injection valve opening pressure adjusting mechanism. The injection valve opening pressure adjusting mechanism is provided with a pressure adjusting chamber 37 into which the fuel (pressure Pt) inside the high pressure fuel chamber is induced as shown in FIG. 3, and the pressure in a pressure adjusting chamber 37 is adjusted by controlling the constriction of an escape passage 37 that communicates between the pressure adjusting chamber 37 and the low pressure side of the feed pump (fuel induction side) with an electromagnetic valve 39. The adjusted pressure Pt' is supplied to the various injection nozzles 40 via the pressure inlet port 49 shown in FIG. 2.

The fuel intake 48 communicates with a fuel inflow chamber 56 via a passage 51 formed in the nozzle holder 41, a passage 52 formed in the cylinder 43, a passage 53 formed in the nozzle holder main body 42, a passage 54 formed in the spacer 46 and a passage 55 formed in the nozzle body 45 so that the high pressure fuel flowing in from the fuel intake 48 is induced to a tapered portion 58a of the needle valve 58 that is housed in a fitting hole 57 of the nozzle body in such a manner that it can slide.

A flat damping mechanism 60 is provided at the lower end portion of the pressure inlet port 49 which communicates with a fitting hole 62 of the cylinder 43 via the flat damping mechanism 60 and a passage 61 that is formed in the nozzle holder head 41. In the fitting hole 62, the piston 63 is housed in such a manner that it can slide. A fitting hole 64 which communicates with the fitting hole 62 of the cylinder 43 is formed in the nozzle holder main body 42 and a plunger 65 is inserted in the fitting hole 64 in such a manner that it can slide freely with the upper end of the plunger 65 in contact with the lower end surface of the piston 63. In addition, a mobile spring seat 66 is provided at the lower end of the plunger 65 and the upper end of the needle valve 58 is fitted in a connecting hole that is formed at the lower end of the mobile spring seat 66 so that the plunger 65 can move in unison with the needle valve 58.

The mobile spring seat 66 is positioned in a spring housing chamber 67 formed in the nozzle holder main body 42 and the spring 69 is provided so that it can apply force between this mobile spring seat 66 and a fixed spring seat 68 that is fixed to the upper end of the spring housing chamber 67. A force is thus constantly applied to the needle valve 58 by the spring 69 in the direction in which a hole 70, formed at the front end of the nozzle body 45, is closed.

Furthermore, the fitting hole 64 in which the plunger 65 is inserted, is connected to a passage 71 that is formed in the nozzle holder main body 42. The passage 71 in turn, communicates with the overflow outlet port 50 via a passage 72 formed in the cylinder and a passage 73 formed in the nozzle holder head 41.

The flat damping mechanism 60 consists of a valve body 75, at the middle of which a through hole is formed, a valve seat 76 at the middle of which a hole of diameter smaller than that of the aforementioned through hole, and a flat valve 77 that is provided with play between the valve body 75 and the valve seat 76 with an orifice formed at its center and also with an indentation formed around it facing the through hole of the valve body 75. As a result, when fuel, with its pressure at Pt' is supplied to the pressure inlet port 49, the wave pulse in the fuel is inhibited as the fuel passes through the flat damping mechanism 60 and the fuel is induced to the upper surface of the piston 63 through the passage 61 to apply a flat pressure Pt to the upper surface of the piston 63. This pressure Pt works on the needle valve 58 via the plunger 65 and the mobile spring seat 66 to work with the spring force of the spring 69 to press the needle valve 58 in the direction in which the hole 70 closes.

While the needle valve 58 is being pressed in this manner, if high pressure fuel is force fed from the fuel intake 48, the fuel flows into the fuel inflow chamber 56 via the passages 51~55 to apply force to the tapered portion 58a of the needle valve 58. If this force working on the tapered portion 58a becomes larger than the combined force of the spring force applied to the needle valve 58 and the pressure Pt', the needle valve 58 is pushed up and the fuel is injected through the hole 70.

Note that the injection quantity control during the initial stage of the injection period is realized through controlling the injection start time (injection timing) and the injection rate during the initial injection rate control period. Because of this, in the present invention, the injection start time and the injection rate during the initial injection rate control period are controlled by detecting the signal that corresponds to the injection rate and identifying the initial injection state based upon this signal so that the desired initial injection state can be achieved.

For the signal that corresponds to the injection rate, either an signal output from a sensor that detects either directly or indirectly the pressure (Pt') inside the pressure adjusting chamber or a signal output from the needle valve lift sensor that detects the quantity of lift of the needle valve 58 may be used. Furthermore, this signal may be an signal output from a piezoelectric element that is provided at one end of the spring 69 so that spring pressure is applied to it. In this embodiment, however, a signal output from the needle valve lift sensor 80 is used as the signal that corresponds to the fuel injection rate and the needle valve lift sensor 80 comprises a detection coil or the like provided, for example, at the spacer 46. The output from this needle valve lift sensor 80 is input to the control unit 82 to be described below.

The control unit 82, is structured with a drive circuit that drives the actuator 2, the timing control valve 31, the electromagnetic valve 39, a microcomputer that controls the drive circuit, an input circuit for inputting signals to the microcomputer and the like. The microcomputer is provided with a central processing unit (CPU), a ROM, a RAM, an A/D converter and the like. The rotation speed N of the engine 81, the water temperature signal TW, which indicates the temperature of the engine cooling water and the like, as well as the signal S from the needle valve lift sensor 80 are input to the input circuit of the control unit 82. These signals are processed and then used to drive and control the actuator (ACT) 2, the timing control valve (TCV) 31 and the electromagnetic valve 39 of the fuel injection pump in conformance to a specific program (refer to FIG. 3).

Figure 4:
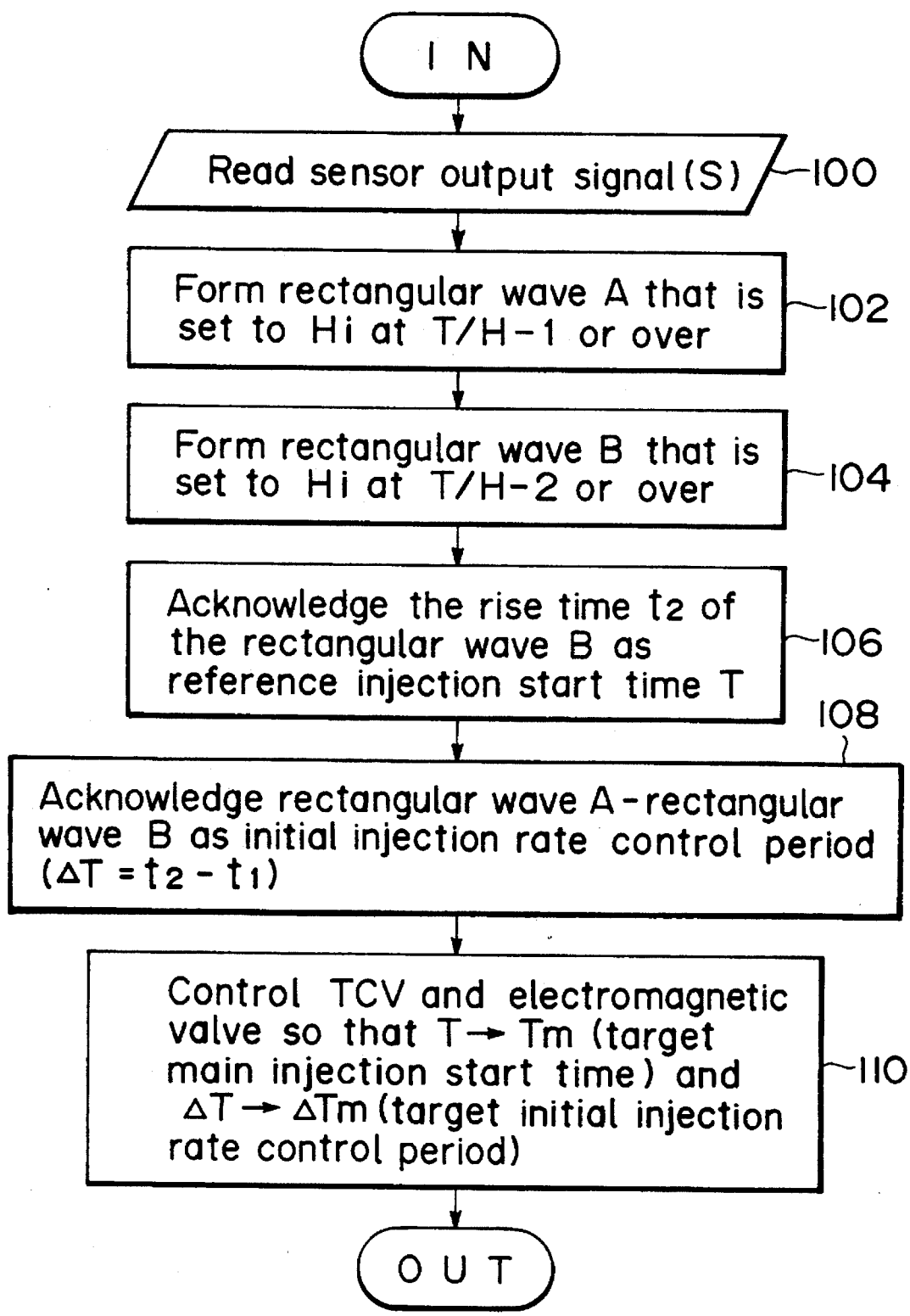
FIG. 4 is a flow chart showing an example of control performed on the timing control valve (TCV) and the electromagnetic valve based upon the waveform shown in FIG. 5(a)
Figure 5:
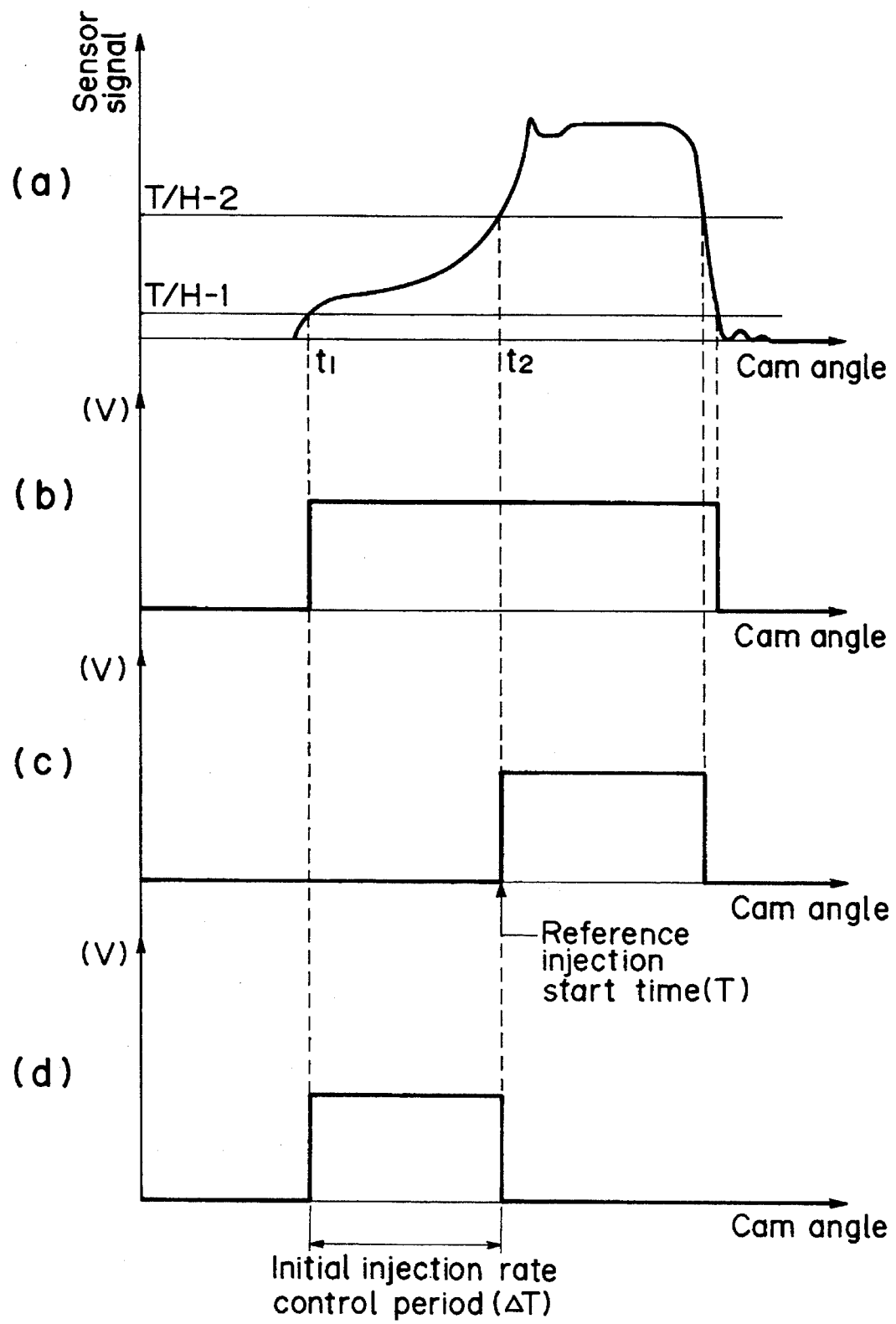

In FIG. 4, an example of a control operation for the timing control valve (TCV) 31 and the electromagnetic valve 39 is shown. In step 100, the control unit 82 reads the output signal S (shown in FIG. 5(*a*)) from the needle valve lift sensor 80 and in steps 102 and 104, it compares it against, for instance, two thresholds (T/H–1, T/H–2) that are set in advance and then performs the subsequent processing: In step 102, the rectangular wave A is formed (shown in FIG. 5(*b*)) and is set to HI when the level of the signal from the needle valve lift sensor 80 is at T/H–1 or higher. In step 104, the rectangular wave B is formed (shown in FIG. 5(*c*)) and is set to HI when the level of the signal from the sensor 80 is at T/H–2 or higher. Here, T/H–1 is set at a level which is somewhat higher than level 0, in order to eliminate noise and the like which come on the output signal from the sensor, and T/H–2 is set at a level higher than T/H–1 by a specific amount.

As factors for specifying the initial injection state, the injection start time (T), which is used as a reference, and the initial injection rate control period ($\Delta T$) may be used, and in order to identify them, first in step 106 the rise timing $t_2$ of the rectangular wave B at which the main injection starts is identified as the reference injection start time T. The reason for setting the main injection start time as the reference injection start time is that it is possible to control the optimal injection timing for engine emission characteristics and economy with a higher degree of precision with the start time of the main injection as reference, when most of the fuel is being injected, rather than with the start of the initial injection rate control period, when the fuel injection quantity is small. However, it is also acceptable to identify the start time of the initial injection and to perform control using this as reference injection start time. Also, in step 108, the waveform that results from subtracting the rectangular wave B from the rectangular wave A (shown in FIG. 5(*d*)) represents the initial injection before the main injection and, therefore, the period between its rise and its fall is identified as the initial injection rate control period ($\Delta T = t_2 - t_1$). Since the larger the fuel injection quantity during the ignition delay period (main injection) the more NOx is generated, the optimal value for the initial injection quantity with such factors as NOx taken into consideration can be determined by changing $\Delta T$ once the reference injection start time T is determined.

The optimal reference injection start time and the optimal initial injection rate control period that corresponds to the operating conditions of the engine (the rotation rate N, the engine cooling water temperature TW, and the like) are stored in the ROM as the target reference injection start time (Tm) and the target initial injection rate control period ($\Delta$Tm) respectively. In step 110, a control signal is output to the TCV 31 and the electromagnetic valve 39 so that T will be equal to TM and $\Delta T$ will be equal to $\Delta$Tm and the injection timing and the back pressure of the piston 63 (= Pt') with which the desired initial injection quantity can be obtained, are set.

As a result, since the optimal reference injection start time Tm and the optimal initial injection rate control period $\Delta$Tm, which best suit the operating conditions are set based upon the measured values T and $\Delta T$ on the injection nozzle side, and optimal injection control can be realized even during the initial stage of the injection period.

Figure 6:
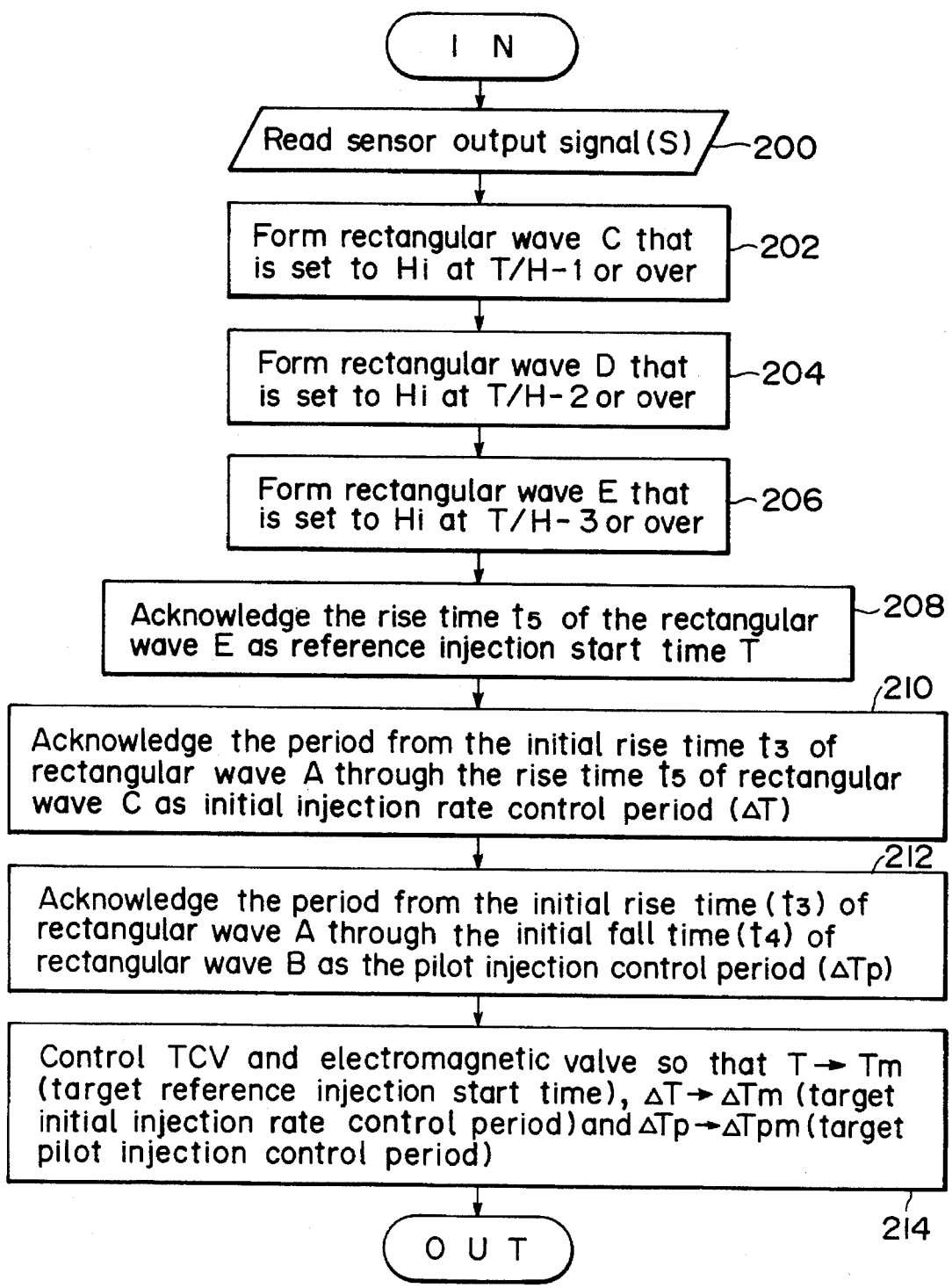
FIG. 6 is a flow chart showing another example of control performed on the timing control valve (TCV) and the electromagnetic valve based upon the waveform shown in FIG. 7(a)
Figure 7:
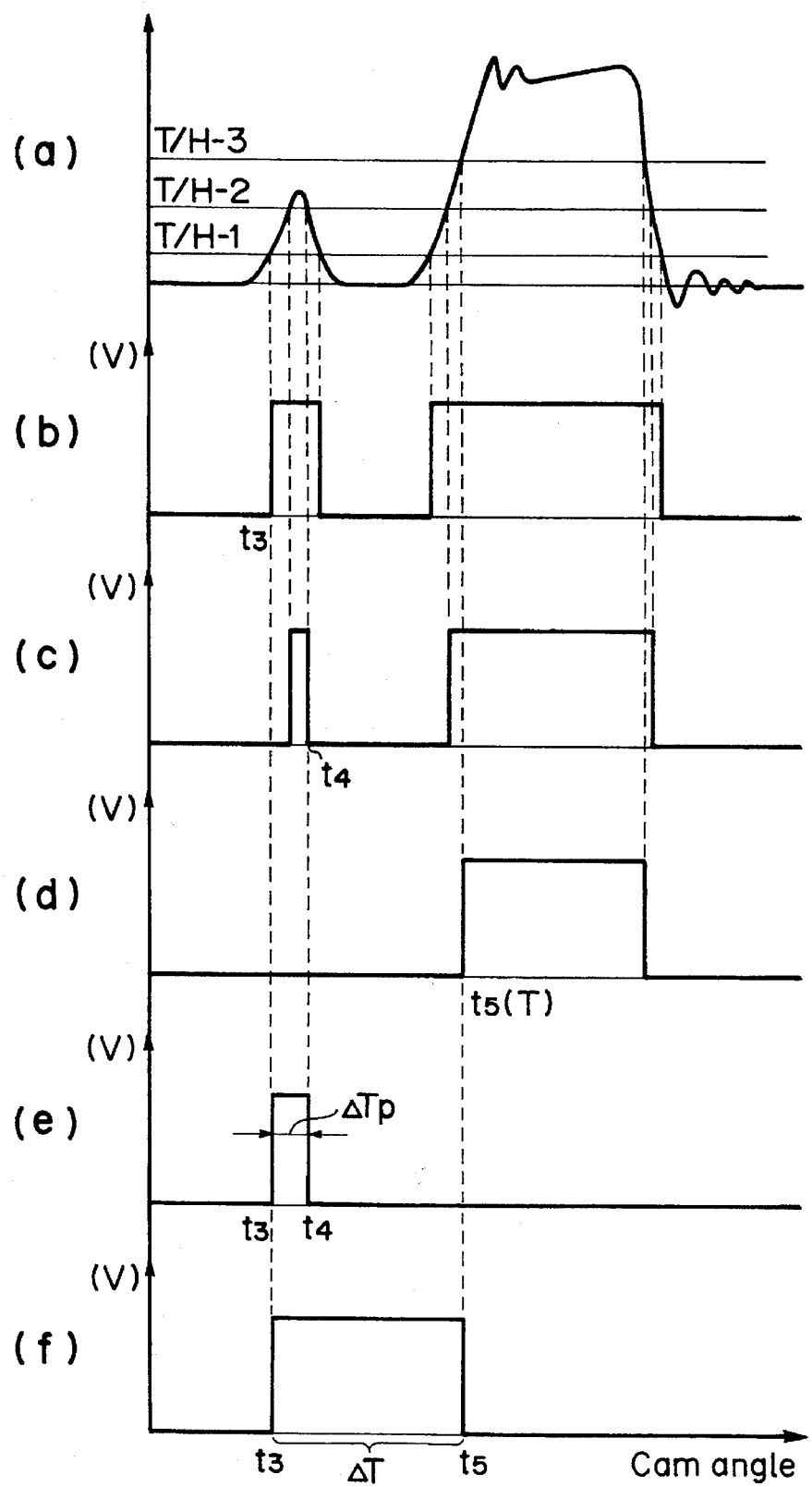

FIGS. 6 and 7 show an example of control performed for the timing device 25 and the electromagnetic valve 39 by identifying the reference injection start time, the initial injection rate control period and the pilot injection control period, based upon the waveform from the needle valve lift sensor 80.

In a structure similar to that of the embodiment, if the output waveform from the needle valve lift sensor 80 is as shown in FIG. 7(*a*), then in step 200, the control unit 82 reads the output signal S from the needle valve lift sensor 80 and in steps 202 through 206 compares it with, for instance, three thresholds (T/H–1, T/H–2, T/H–3) that are set in advance and performs the following processing: In step 202, the rectangular wave C is formed (shown in FIG. 7(*b*)), and is set to HI when the level of the signal from the needle valve lift sensor 80 is at T/H–1 or higher. In step 204 the rectangular wave D is formed (shown in FIG. 7(*c*)), and is set to HI when the level of the signal from the sensor 80 is at T/H–2 or higher. In step 206 the rectangular wave E is formed (shown in FIG. 7(*d*)), and is set to HI when the level of the signal from the sensor 80 is at T/H–3 or higher. Here, T/H–1 is set at a level that is somewhat higher than level 0 in order to eliminate noise and the like that comes on the output signal from the sensor. T/H–2 is set at a level higher than T/H–1 by a specific amount and T/H–3 is set at a level higher than T/H–2 by a specific amount.

In step 208, the time when the main injection starts is taken at the time point $t_5$, at which the rectangular wave E rises. This is identified as the reference injection start time T. Then in step 210, the period (the width of the waveform shown in FIG. 7(*f*)) between the initial rise time ($t_3$) of the rectangular wave C and the rise time ($t_5$) of the rectangular wave E is treated as the initial injection preceding the main injection and this is identified as the initial injection rate control period ($\Delta T = t_5 - t_3$). Furthermore, in step 212, the period ($t_4 - t_3$: the width of the waveform shown in FIG. 7(*e*)) between the initial rise time ($t_3$) of the rectangular wave C and the initial fall time ($t_4$) of the rectangular wave D is identified as the pilot injection control period ($\Delta$Tp), during which pilot injection is performed.

The optimal reference injection start time, the optimal initial injection rate control period and the optimal pilot injection control period that correspond to the drive conditions of the engine (the rotation rate, the engine cooling water temperature, and the like) are stored in ROM as the target main injection start time (Tm) and the target initial injection rate control period ($\Delta$Tm) and the target pilot injection control period ($\Delta$Tpm) respectively. In step 214, a control signal is output to the TCV 31 and the electromagnetic valve 39 so that T will be equal to TM, ΔT will be equal to ΔTm and ΔTp be equal to ΔTpm, to set the injection timing and the back pressure of the piston 63 (= Pt') with which the desired initial injection quantity can be obtained.

As a result, since the optimal reference injection start time Tm and the optimal initial injection rate control period ΔTm, and the optimal pilot injection control period ΔTpm which best suit the operating conditions are set based upon the measured values (T, ΔT, ΔTp) on the injection nozzle side, the optimal pilot injection during the initial stage of the injection period and the optimal period between the pilot injection and the main injection (separation) are achieved.

Note that although in this embodiment too, the reference injection start time is used as the main injection start time, it may be used as the pilot injection start time.

Also, although the embodiments described above have two or three thresholds set, it goes without saying that the larger the number of thresholds, the more accurately the waveform output from the sensor can be identified. Therefore, the number of thresholds may be increased as necessary.

Furthermore, while the examples described above are used in a damper type injector, a technology identical to this may be applied to a prestroke variable injection system or to other types of injection systems to perform feedback control for the main injection start time and the initial injection rate control period.

What is claimed is;

1. A fuel injection control apparatus comprising:

a compression mechanism for compressing fuel;

an injection nozzle that injects the fuel compressed in said compression mechanism;

an injection valve opening pressure adjusting mechanism that adjusts the injection valve opening pressure of said injection nozzle;

a timing device that adjusts an injection timing of the fuel;

a sensor that outputs an output signal indicative of an injection rate of the fuel;

calculating means, having a plurality of preset thresholds corresponding to respective injection rates of the fuel, for calculating at least an initial injection rate control period and a reference injection start time, the initial injection rate control period being a period from a time when the output signal reaches a first threshold which defines a start of injection to a time when the output signal reaches at a second threshold which is higher than the first threshold, and the reference injection start time being a time when the output signal reaches a third threshold which defines the reference injection start time; and control means for controlling the injection valve opening pressure through said injection valve opening pressure adjusting mechanism and for controlling the injection timing through said timing device in such a manner that said initial injection rate control period and said reference injection start time becomes an optimal initial injection rate control period and an optimal reference injection start time which are stored in a memory in advance.

2. A fuel injection control apparatus according to claim 1, wherein said second and third thresholds are the same.

3. A fuel injection control apparatus according to claim 1, wherein said third threshold is higher than said second threshold.

4. A fuel injection control apparatus according to claim 1, wherein said calculating means further calculates a pilot injection control period from a time when the output signal reaches the first threshold to the time when the output signal decreases to the second threshold after previously exceeding the second threshold; and wherein said control means further controls the injection valve opening pressure through said injection valve opening pressure adjusting mechanism and the injection timing through said timing device so that the pilot injection control period becomes a predetermined optimal injection control period.

5. A fuel injection control apparatus according to claim 4, wherein said third threshold is higher than said second threshold.

6. A fuel injection control apparatus according to claim 1, wherein said sensor is a needle valve lift sensor that detects a lift of a needle valve.

7. A fuel injection control apparatus according to claim 1, wherein said injection valve opening pressure adjusting mechanism includes a pressure adjusting chamber into which fuel is inducted from an injection pump and the pressure in said pressure adjusting chamber is adjusted by controlling the constriction of an escape passage that communicates between said pressure adjusting chamber and the fuel induction side of a feed pump that draws fuel into said fuel injection pump via an electromagnetic valve.

8. A fuel control apparatus according to claim 1, wherein said injection nozzle includes a passage for inducting fuel to a tapered portion of a needle valve from an injection pump and a pressure inlet port which forces the fuel from said injection valve opening pressure adjusting mechanism on said needle valve in the direction in which it moves.

\* \* \* \* \*